US010045525B2

(12) United States Patent
Husseiny et al.

(10) Patent No.: US 10,045,525 B2
(45) Date of Patent: Aug. 14, 2018

(54) ACTIVE NON-LETHAL AVIAN DENIAL INFRASOUND SYSTEMS AND METHODS OF AVIAN DENIAL

(71) Applicants: TECHNOLOGY INTERNATIONAL INCORPORATED, LaPlace, LA (US); EMINENT TECHNOLOGY INCORPORATED, Tallahassee, FL (US)

(72) Inventors: Abdo A. Husseiny, LaPlace, LA (US); Omar Abdallah, Woodland Hills, CA (US); F. Bruce Thigpen, Tallahasee, FL (US); Ajay Mahajan, North Canton, OH (US); Jonathan Tyron Hagstrum, Menlo Park, CA (US); Zeinab A. Sabri, LaPlace, LA (US)

(73) Assignees: TECHNOLOGY INTERNATIONAL INCORPORATED, LaPlace, LA (US); EMINENT TECHNOLOGY INCORPORATED, Tallahassee, FL (US)

( * ) Notice: Subject to any disclaimer, the term of this patent is extended or adjusted under 35 U.S.C. 154(b) by 618 days.

(21) Appl. No.: 14/197,122

(22) Filed: Mar. 4, 2014

(65) Prior Publication Data
US 2014/0185414 A1 Jul. 3, 2014

Related U.S. Application Data

(62) Division of application No. 12/942,611, filed on Nov. 9, 2010, now abandoned.

(51) Int. Cl.
*A01M 29/00* (2011.01)
*A01M 29/16* (2011.01)
*H04R 27/00* (2006.01)

(52) U.S. Cl.
CPC ............. *A01M 29/16* (2013.01); *H04R 27/00* (2013.01)

(58) Field of Classification Search
USPC .......................................... 367/139
See application file for complete search history.

(56) References Cited

U.S. PATENT DOCUMENTS

| 2,043,416 A | 6/1936 | Lueg |
| 2,304,358 A | 12/1942 | Hennefer |

(Continued)

OTHER PUBLICATIONS

Hagstrum, "Infrasound and the Avian Navigational Map", The Jounal of Experimental Biology vol. 203, p. 1103-1111, published on Mar. 9, 2000.

*Primary Examiner* — James R Hulka
(74) *Attorney, Agent, or Firm* — Studebaker & Brackett PC

(57) ABSTRACT

An active non-lethal infrasound system for denying all bird species access to critical areas, particularly in areas around aircraft and other high value systems. The system comprises a plurality of infrasound generators broadcasting continuous infrasonic signals to create a bird-free infrasound active zone within the perimeters of the protected critical area and an infrasound-free dead zones for birds being denied access to the critical areas. Further, an active infrasonic barrier is assembled within an exclusion area surrounding the bird-free infrasound active zone to dampen all low frequency sound waves emanating from the critical area and its perimeters. Wherever the situation allows, a wildlife sanctuary is preferably established further from the exclusion area to attract and protect birds, enforced by broadcasting infrasound signals that simulate natural sounds that attract species typical of the geographic location.

20 Claims, 8 Drawing Sheets

(56) References Cited

U.S. PATENT DOCUMENTS

| | | | |
|---|---|---|---|
| 2,920,600 A | 1/1960 | Hori et al. |
| 2,922,999 A | 1/1960 | Carlin |
| 2,941,197 A | 6/1960 | Marotta |
| 3,056,376 A | 10/1962 | Bender |
| 3,138,138 A | 6/1964 | Quittner |
| 3,612,211 A | 10/1971 | Clark |
| 3,886,492 A | 5/1975 | White |
| 3,897,195 A | 7/1975 | Finch |
| 4,105,992 A | 8/1978 | Luciano |
| 4,284,845 A | 8/1981 | Belcher |
| 4,414,653 A | 11/1983 | Pettinger |
| 4,473,906 A | 9/1984 | Warnaka et al. |
| 4,475,102 A | 10/1984 | Troy et al. |
| 4,563,759 A | 1/1986 | Hayakawa |
| 4,564,727 A | 1/1986 | Danley et al. |
| 4,628,500 A | 12/1986 | Thigpen et al. |
| 4,658,386 A | 4/1987 | Morris |
| 4,736,907 A | 4/1988 | Steffen |
| 4,758,826 A | 7/1988 | Wall |
| 4,763,358 A | 8/1988 | Danley |
| 4,769,794 A | 9/1988 | Beuter et al. |
| 4,802,057 A | 1/1989 | Patterson et al. |
| 4,837,838 A | 6/1989 | Thigpen et al. |
| 4,870,779 A | 10/1989 | Johnson et al. |
| 4,903,630 A | 2/1990 | Rezmer |
| 4,922,468 A | 5/1990 | Menezes |
| 4,933,918 A | 6/1990 | Landsrath et al. |
| 1,964,331 A | 10/1990 | Halevy et al. |
| 4,965,552 A | 10/1990 | Price et al. |
| 4,998,091 A | 3/1991 | Rezmer |
| 4,999,818 A | 3/1991 | Malleolo |
| 5,009,192 A | 4/1991 | Burman |
| 5,191,618 A | 3/1993 | Hisey |
| 5,208,787 A | 5/1993 | Shirley |
| 5,210,719 A | 5/1993 | Lawrence |
| 5,214,411 A | 5/1993 | Herbruck |
| 5,224,438 A | 7/1993 | Buss |
| 5,270,707 A | 12/1993 | Schulte et al. |
| 5,281,777 A | 1/1994 | Alton, Jr. |
| 5,341,762 A | 8/1994 | Petersen |
| 5,396,561 A | 3/1995 | Popovich et al. |
| 5,418,518 A | 5/1995 | Schenken et al. |
| 5,463,595 A | 10/1995 | Rodhall et al. |
| 5,484,969 A | 1/1996 | McKendree et al. |
| 5,598,379 A | 1/1997 | Malleolo |
| 5,602,523 A | 2/1997 | Turchioe et al. |
| 5,610,876 A | 3/1997 | Jeffers |
| 5,662,136 A | 9/1997 | Drzewiecki et al. |
| 5,701,350 A | 12/1997 | Popovich |
| 5,721,401 A | 2/1998 | Sim |
| 5,774,088 A | 6/1998 | Kreithen |
| 5,802,189 A | 9/1998 | Blodget |
| 5,825,901 A | 10/1998 | Hisey |
| 5,870,972 A | 2/1999 | Zinter et al. |
| 5,892,446 A | 4/1999 | Reich |
| 5,901,235 A | 5/1999 | Thigpen et al. |
| 5,936,209 A | 8/1999 | Alton, Jr. |
| 5,940,347 A | 8/1999 | Raida et al. |
| 5,977,866 A | 11/1999 | Joseph, Jr. et al. |
| 5,978,489 A | 11/1999 | Wan |
| 6,003,471 A | 12/1999 | Ohba |
| 6,014,448 A | 1/2000 | Alton, Jr. |
| 6,016,100 A | 1/2000 | Boyd et al. |
| 6,082,285 A | 7/2000 | Hinrichs |
| 6,104,283 A | 8/2000 | Otomo |
| 6,104,825 A | 8/2000 | Thigpen |
| 6,119,806 A | 9/2000 | Baffoni |
| 6,133,656 A | 10/2000 | Hisey |
| 6,134,184 A | 10/2000 | Waletzky et al. |
| 6,155,111 A | 12/2000 | Wickern et al. |
| 6,166,996 A | 12/2000 | Grissom et al. |
| 6,170,436 B1 | 1/2001 | Goodson et al. |
| 6,185,310 B1 | 2/2001 | Kermani et al. |
| 6,190,022 B1 | 2/2001 | Tocci et al. |
| 6,191,693 B1 | 2/2001 | Sangsingkeow |
| 6,250,255 B1 | 6/2001 | Lenhardt et al. |
| 6,285,630 B1 | 9/2001 | Jan |
| 6,396,402 B1 | 5/2002 | Berger et al. |
| 6,400,995 B1 | 6/2002 | Patterson et al. |
| 6,418,674 B1 | 7/2002 | Deraedt |
| 6,477,977 B1 | 11/2002 | Combes |
| 6,570,494 B1 | 5/2003 | Leftridge, Sr. |
| 6,575,597 B1 | 6/2003 | Cramer et al. |
| 6,611,604 B1 | 8/2003 | Irby et al. |
| 6,623,243 B1 | 9/2003 | Hodos |
| 6,625,918 B2 | 9/2003 | Bhullar |
| 6,665,413 B1 | 12/2003 | Domen |
| 6,690,265 B2 | 2/2004 | Hagstrum |
| 6,700,486 B1 | 3/2004 | Banki |
| 6,710,705 B1 | 3/2004 | Smith et al. |
| 6,718,681 B2 | 4/2004 | Bhullar |
| 6,742,471 B2 | 6/2004 | Laidler |
| 6,754,353 B1 | 6/2004 | Cheng |
| 6,760,462 B1 | 7/2004 | Thigpen |
| 6,765,487 B1 | 7/2004 | Holmes et al. |
| 6,788,417 B1 | 9/2004 | Zumberge et al. |
| 6,793,364 B2 | 9/2004 | Cramer et al. |
| 6,814,021 B1 | 11/2004 | Turkewitz |
| 6,853,328 B1 | 2/2005 | Guice et al. |
| 6,856,243 B2 | 2/2005 | Smith et al. |
| 6,887,031 B1 | 5/2005 | Tocher |
| 6,940,424 B2 | 9/2005 | Philiben et al. |
| 6,941,886 B1 | 9/2005 | Suelzer |
| 6,963,652 B1 | 11/2005 | Colombo |
| 6,996,029 B1 | 2/2006 | Boyd et al. |
| 7,088,841 B2 | 8/2006 | Kallen |
| 7,098,775 B2 | 8/2006 | Perlo et al. |
| 7,106,180 B1 | 9/2006 | Pompei |
| 7,106,216 B1 | 9/2006 | Maher |
| 7,106,866 B2 | 9/2006 | Astorino et al. |
| 7,134,342 B1 | 11/2006 | Mueller et al. |
| 7,134,807 B2 | 11/2006 | Dreyer |
| 7,173,534 B1 | 2/2007 | Markham et al. |
| 7,220,096 B2 | 5/2007 | Tocher |
| 7,227,452 B1 | 6/2007 | Frost |
| 7,239,655 B2 | 7/2007 | Casazza |
| 7,256,339 B1 | 8/2007 | Carmichael |
| 7,263,033 B2 | 8/2007 | Borsina et al. |
| 7,267,196 B2 | 9/2007 | Mathur |
| 7,268,689 B2 | 9/2007 | Sulaver |
| 7,269,537 B1 | 9/2007 | Mattern |
| 7,278,375 B2 | 10/2007 | Ross et al. |
| 7,305,094 B2 | 12/2007 | Kashani |
| 7,315,799 B1 | 1/2008 | Podolsky |
| 7,324,408 B2 | 1/2008 | Cilliers |
| 7,324,409 B1 | 1/2008 | Zweesaardt |
| 7,333,395 B2 | 2/2008 | Lewis et al. |
| 7,337,750 B2 | 3/2008 | Drake |
| 7,380,435 B1 | 6/2008 | Henderson et al. |
| 7,411,504 B2 | 8/2008 | Hanscom |
| 7,450,472 B2 * | 11/2008 | Guyvarch ............... 367/139 |
| 7,454,030 B2 | 11/2008 | Graber |
| 7,462,364 B2 | 12/2008 | Bell |
| 7,491,064 B1 | 2/2009 | Barton et al. |
| 7,501,979 B1 | 3/2009 | Guice et al. |
| 7,506,815 B2 | 3/2009 | Spiegel |
| 7,537,358 B2 | 5/2009 | De Ginto et al. |
| 7,598,879 B2 | 10/2009 | Weiser et al. |
| 7,624,839 B1 | 12/2009 | Graber |
| 7,653,209 B2 | 1/2010 | Abe et al. |
| 7,654,217 B2 | 2/2010 | Sullivan |
| 7,671,749 B2 | 3/2010 | Alvarado |
| 7,690,146 B2 | 4/2010 | Jong et al. |
| 7,698,853 B2 | 4/2010 | Ragon et al. |
| 7,699,018 B2 | 4/2010 | Wells |
| 7,712,263 B1 | 5/2010 | Lippie |
| 7,743,724 B2 | 6/2010 | Broser |
| 7,760,899 B1 | 7/2010 | Graber |
| 7,777,747 B1 | 8/2010 | Krenz |
| 7,792,312 B2 | 9/2010 | Inoue et al. |
| 7,796,046 B2 | 9/2010 | Weiser et al. |
| 7,841,291 B1 | 11/2010 | Milanovich |
| 2002/0154498 A1 * | 10/2002 | Cramer et al. ............. 362/112 |
| 2003/0102964 A1 | 6/2003 | Hagstrum |

(56) References Cited

U.S. PATENT DOCUMENTS

| | | |
|---|---|---|
| 2003/0185404 A1 | 10/2003 | Milsap |
| 2004/0151325 A1* | 8/2004 | Hooley et al. .................. 381/18 |
| 2005/0063559 A1 | 3/2005 | Lee et al. |
| 2006/0225668 A1 | 10/2006 | Ross et al. |
| 2008/0163828 A1 | 7/2008 | Ingraham et al. |
| 2008/0225644 A1* | 9/2008 | Guyvarch .................... 367/139 |
| 2009/0120374 A1 | 5/2009 | Hansen |
| 2009/0311099 A1 | 12/2009 | Richards |
| 2010/0053169 A1 | 3/2010 | Cook |

* cited by examiner

ACTIVE NON-LETHAL AVIAN DENIAL INFRASOUND SYSTEMS AND METHODS OF AVIAN DENIAL

This invention was made with government support under Contract Number: FA9302-10-M-0011 awarded by The United States of America as represented by the Department of the Interior, Washington, D.C. The government has certain rights in the invention.

TECHNICAL FIELD

The invention relates to non-lethal means of denying all species of birds access to critical areas of the airports and runways, particularly around aircrafts and other high value systems. The invention also relates to non-lethal means for repelling all species of birds from areas wherein their presence poses potential interference with human activities and destruction or deterioration of man-made objects and structures while steering them to veer towards safer habitats using infrasound signals based on natural stimuli.

BACKGROUND

Bird strikes to both military and civilian aircrafts represent a common threat to flight safety and have caused numerous unavoidable accidents leading to human casualties and higher rate of bird kills Most accidents occur when the bird hits the windscreen or flies into the engines. These accidents cause annual damages that have been estimated at $400 million within the United States alone and up to $1.2 billion to commercial aircrafts worldwide. Additionally, damages in and around the facilities and aircrafts where birds nest and congregate cost millions of dollars in the man-hours needed for bird strike prevention and clean-up.

Major accidents involving civil aircrafts are quite low and it has been estimated that there is only about 1 accident resulting in human death in one billion ($10^9$) flying hours. The majority of bird strikes (65%) cause little damage to the aircraft but result in a great number of bird fatalities.

The force of the impact on an aircraft depends on the weight of the animal and the speed difference and direction at the impact. The energy of the impact increases with the square of the speed difference. Hence, a low-speed impact of a small bird on a car windshield causes relatively little damage. High speed impact, as with jet aircraft, can cause considerable damage and even catastrophic failure to the vehicle. The energy of a 5 kg (11 lb) bird moving at a relative velocity of 275 km/h (171 mph) approximately equals the energy of a 100 kg (220 lb) weight dropped from a height of 15 meters (49 ft). The momentum of the bird in this case is considerably less than that of the ton weight, and, therefore, the force required to deflect it is also considerably less. However, according to the FAA, only 15% of strikes (ICAO 11%) actually result in damage to the aircraft.

Most often, bird strikes occur during takeoff or landing, or during low altitude flights. However, bird strikes have also been reported at high altitudes, some as high as 6,000 m (19,685 ft) to 9,000 m (29,528 ft) above the ground. Bar-headed geese have been seen flying as high as 10,175 m (33,383 ft) above sea level. An aircraft over the Côte d'Ivoire collided with a Rüppell's Vulture at an astonishing altitude of 11,300 m (37,073 ft), the current record avian height. Majority of bird collisions occur near or on airports (90%, according to the International Civil Aviation Organization (ICAO)) during takeoff, landing and associated phases. According to the FAA Wildlife Hazard Management Manual (2005), less than 8% of strikes occur above 900 m (2,953 ft) and 61% occur at less than 30 m (100 ft). The point of impact is usually any forward-facing edge of the vehicle such as a wing leading edge, nose cone, jet engine cowling or engine inlet.

Accordingly, there is a need for an avian denial system at airports and airfields that deny or repel birds access to critical areas of the airport and runways, particularly to areas around aircrafts and other high value systems, thereby avoiding or reducing potential property damage and possible loss of life. The domain of the action of the avian denial system must extend beyond the airfield or the airspace of the airport to provide safe passage of aircrafts during takeoff, landing, and during low altitude flights within and near the airspace. The avian denial system must be capable of preventing other forms of damage caused by birds nesting and perching in unwanted areas and assure collision avoidance between aircraft and birds with the highest probability possible during daily flight operations without impacting mission requirements.

Birds roosting or feeding in the vicinity of runways or flying in the airspace of the airport are often startled by an approaching aircraft and, in an attempt to escape, may be forced to take flight within the flight path of the aircraft and get sucked into a jet turbine. Jet engine ingestion is extremely serious due to the rotation speed of the engine fan and engine design. As the bird strikes a fan blade, that blade can be displaced into another blade and so forth, causing a cascading failure. Jet engines are particularly vulnerable during the takeoff phase when the engine is turning at a very high speed and the plane is at a low altitude where birds are more commonly found.

Accordingly, there is also a need for an active non-lethal avian denial system that will not injure, kill or affect the well-being of birds around airports and airfields. The system must be capable of detecting birds flying into an area where there is a potential for collision with an aircraft. For the system to be used by the U.S. military, the active non-lethal avian denial system should comply with the requirements necessary to manage the natural resources of each military reservation within the United States and to conserve migratory birds and their habitat. At the same time, the system must not interfere with any current operational aircraft or ground-based sensor systems and must not impact airport personnel or other people in the vicinity of the airport/aircraft.

There is a further need of a non-lethal avian denial system that is more capable than the current audio deterrent systems, which are only marginally effective and are further discussed in the Detailed Description section hereinbelow.

SUMMARY OF THE INVENTION

The present invention provides active non-lethal infrasound systems for denying birds access to airstrips and runways (12) and methods for using these systems for the same purpose.

In one embodiment of the invention, an active non-lethal infrasound system for denying all species of birds access to airstrips and runways (12) that include a plurality of in-phase infrasound generators (21) that radiate a plurality of constructive interference patterns of infrasonic waves to create an infrasound active zone (2), which is bird-free and within the airspace portion of the airstrips and runways (12); and a plurality of out-of-phase infrasound generators (31, 32, 41 and 42) that radiate a plurality of destructive interference patterns of infrasonic waves to create one or more infrasound-free dead zones (3 and 4), which are outside the domain of the airstrips and runways and which provide a refuge for birds being repelled from the infrasound active zone (2). The constructive interference patterns of infrasonic waves are intended to "jam" the birds' acoustic navigational system and could mimic natural weather conditions, both of which would repel birds from the infrasound active zone (2).

In another embodiment of the invention, the active non-lethal infrasound system for denying birds access to airstrips and runways (12) include a plurality of in-phase infrasound generators (21) that radiate a plurality of constructive interference patterns of infrasonic waves to create an infrasound active zone (2) that is bird-free; and a plurality of out-of-phase infrasound generators (31, 32, 41 and 42) that radiate a plurality of destructive interference patterns of infrasonic waves to create one or more infrasound-free dead zones (3 and 4), which are outside the domain of the airstrips and runways and which provide a refuge for birds being repelled from the infrasound active zone (2).

In yet another embodiment of the invention, the active non-lethal infrasound system may also include a plurality of in-phase infrasound generators (21) that radiate a plurality of continuous and intermittent infrasound signals to create an infrasound active zone (2), which is bird-free and within the airspace portion of the airfield and a plurality of quieting infrasound generators (51) that radiate a plurality of signals that cancel the plurality of continuous and intermittent infrasound signals radiating at the perimeter of the infrasound active zone (2) to create an infrasound cancellation barrier (5) for controlling the spread of infrasound signals outside the perimeters of the infrasound active zone (2). The active non-lethal infrasound system may further comprise a plurality of out-of-phase infrasound generators (31, 32, 41 and 42) that radiate a plurality of destructive interference patterns of infrasonic waves to create at least two or more infrasound-free dead zones (3 and 4) that are outside the domain of the airstrips and runways, located at opposite sides of the infrasound active zone (2) and extended to cover large spaces.

In yet a further embodiment of the invention, the active non-lethal infrasound system, as described above, may also include a barren exclusion zone (6) that is created around the infrasound cancellation barrier (5) and surround the infrasound active zone (2). The exclusion zone (6) is deprived of any avian life-sustenance amenities and constitutes a no-fly bird zone and is not connected to the at least two or more infrasound-free dead zones (3 and 4) and may include a plurality of quieting infrasound generators (51) that radiate a plurality of signals for cancelling the plurality of continuous and intermittent infrasound signals radiating at the perimeter of the infrasound active zone (2).

The infrasound active zone (2) may be expanded to encompass all areas in the airport including critical areas around aircraft and other high value systems. In addition, one of the extended infrasound-free dead zones (3 or 4) may constitute a bird sanctuary (7) that is furnished with feed, water, grass, seedlings and bushes to provide a refuge for birds being denied access to the infrasound active zone (2) and may have a plurality of infrasound generators (71) installed therein for mimicking the mating calls of a plurality of birds species of interest.

The invention also provides an alternative non-lethal infrasound system applicable and suitable for smaller commercial airports and for airports where infrequent flights occur and no radar is available. Such an alternative infrasound system includes a plurality of pulsating infrasound generators that comprise a row of small acoustic elements (81-86) that are pulsed one by one in a sequence along a row to create a pattern of constructive interference signals that collimate in a beam at a set angle thereby creating a plurality of infrasound active zones (2), leaving a plurality of infrasound-free dead zones (9) in its wake, safe and comfortable for birds to seek a refuge; and a plurality of avian infrasound generators (21) broadcasting a plurality of continuous and intermittent infrasound signals that deter birds from approaching the plurality of infrasound active zones (2) that are bird-free. The alternative system may also further include a plurality of infrasound detectors (101) capable of detecting the presence of birds within the proximity of the airstrips and runways and working in concert with a plurality of radars (102).

The invention also provides various methods for using these active non-lethal infrasound systems for denying and repelling all species of birds having access to all critical areas of the airports and runways.

Still other aspects, features, and advantages of the invention are readily apparent from the following detailed description, by illustrating a number of exemplary embodiments and implementations, including the best mode contemplated for carrying out the invention. The invention is also capable of other and different embodiments, and its several details can be modified in various respects, all without departing from the spirit and scope of the invention. Accordingly, the drawings and descriptions are to be regarded as illustrative in nature, and not as restrictive.

DETAILED DESCRIPTION

Figure 1:
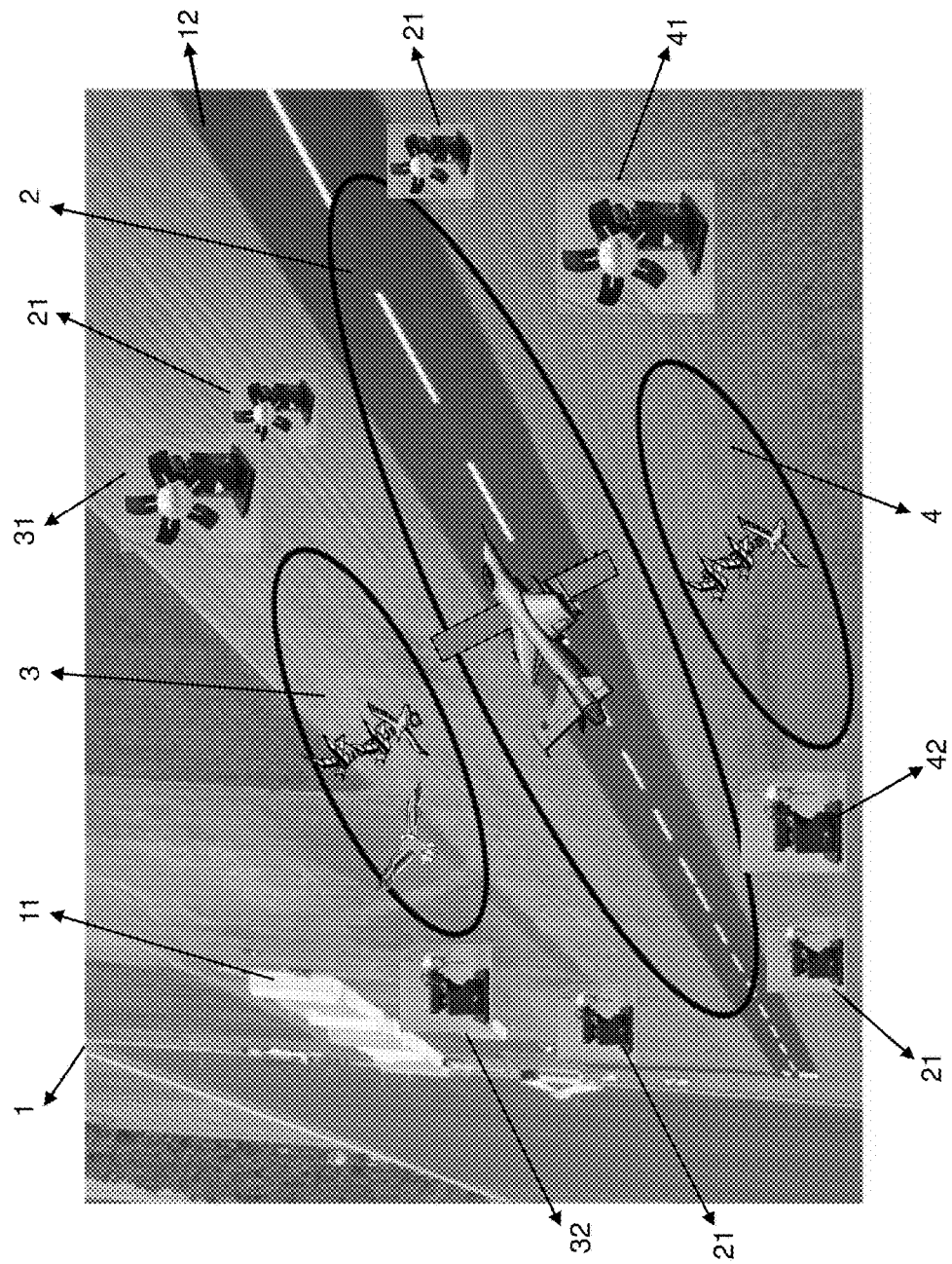
FIG. 1 schematically shows a top view of an airport delineating an infrasound active zone (2) engulfing the runway 12 and two infrasound-free dead zones (3 and 4), one on each side created by the infrasound generators (31, 32, 41 and 42), as displayed for illustration.

Several techniques have been employed or introduced to repel birds from airports and critical areas including a combination of habitat reduction treatments such as using noxious smelling chemicals, electrical fencing and general harassment procedures (e.g., noise propane cannons and metallic strips). Noisemakers are often used, particularly at airports to control large waterfowl and other birds during takeoff. Pyrotechnics including industrial or agricultural fireworks (e.g., shell crackers, bird bombs and screamer sirens) are relatively effective and require active management including proper placement. Such techniques are generally not audibly pleasing to humans and do not provide an acceptable solution for unaware passengers taking off or landing in a commercial jet. Large blasts of sound in a residential neighborhood are not a viable option either. Electric shocks and spikes are employed as deterrent to prevent birds from roosting, nesting and perching in unwanted areas. Such techniques and other physical enforcements techniques are likely to impact the birds' population through injury and death. Such approach would not be in compliance with or fulfill the ecosystem management strategies aiming at conservation of migratory birds and their habitat, which have been initiated, established or being adopted by several U.S. government agencies, including the U.S. Air Force.

Dispersion of birds from an area may be achieved by high decibel explosion. For example, U.S. Pat. No. 2,920,600 to Hori et al. and U.S. Pat. No. 2,941,197 to Marotta disclose feeding a combustible gas from a pressurized tank into a combustion chamber where it is ignited by an electrical igniting element resulting in a high decibel explosion at regular intervals. In U.S. Pat. No. 3,056,376 to Bender, high decibel explosions are produced at regular intervals by igniting a combustible gas in a combustion chamber that is mounted on a turntable. In U.S. Pat. No. 2,304,358 to Hennefer and U.S. Pat. No. 3,897,195 to Finch, combustible gas is produced by introduction of calcium carbide into water, fed into a combustion chamber, and ignited to produce a high decibel explosion. Alternatively, a small exploding charge placed within a combustion chamber is ignited to produce the explosion, as described in U.S. Pat. No. 4,758,826 to Wall in which contained exploding charges, smoke and horns or sirens are activated by remote control to create unnatural commotion. Yet a different approach for bird dispersal at an airport is disclosed in U.S. Pat. No. 4,475,102 to Troy, et al., wherein distributed gas cannons are adapted to cause a detonation or emit a detonation-like sound at a required position or positions, e.g. in relation to an airport runway. The sound emitting devices are selectively controlled by a remote unit via electric cable or wires or via radio transmission. The remote control accommodates for selective operation of the devices at different positions, e.g., an adjacent runway, and also for selection of devices for operation at a particular runway in use or at other required locations, i.e., where there is more than one runway or location.

Further development of the application of high decibel explosion to dispersing birds away from airfields is disclosed in U.S. Pat. No. 5,977,866 to Joseph, Jr. et al., which describes a system comprising a central computer unit and a base antenna system, a hand held transmitter for remote communication to and operation of the central computer unit via the base antenna system, and a plurality of remotely disposed, positionable gas cannons mounted on rotating bases to allow the sound to be directed in a full 360° circle. Each gas cannon is connected to a single control unit with a radio receiver powered by a battery and produces a high decibel explosion by feeding a combustible gas from a pressurized storage tank housed within the control unit. In addition, the system includes an endless recording of chaotic noises in 15-20 second bursts, such as barking dogs, sirens, breaking glass, etc., for broadcasting, simultaneously or alternatively to the gas cannons via all-weather speakers remotely disposed along with the gas cannons.

Several structures and numerous devices are introduced to deter birds from nesting or perching on undesired perch locations on various structures. For example, spike racks are often impractical and unsightly obtrusive, especially in relatively large areas wherein it is necessary to deter relatively big bids (e.g., crows, sea gulls, etc.).

Ultrasonic waves are known to agitate and deter birds from roosting in nearby areas. For example, U.S. Pat. No. 7,227,452 to Frost discloses a device that utilizes solar energy to power a battery pack, which in turn activates both a tone generator and its adjoining amplifier to create and emit the annoying ultrasound, dissuading birds from gathering in particular areas where the ultrasonic device is in use. For a larger scale, U.S. Pat. No. 6,570,494 to Leftridge, Sr. discloses a waterproof cabinet, speakers, power source, processor, and solar panel, which together operate to emit high frequency sound waves that can repel flying pests. These may be contrasted to U.S. Pat. No. 5,602,523 to Woods, which discloses a square wave signal output in the ultrasonic frequency range with harmonic distortion and U.S. Pat. No. 5,341,762 to Petersen for an ultrasonic transmitter is formed from blocks, coupled together to form at least one ultrasonic whistle in fluid communication with a manifold and an acoustic horn. Repelling birds with ultrasonic sound is also disclosed in U.S. Pat. No. 2,922,999 to Carlin and U.S. Pat. No. 3,138,138 to Quittner, both of which require electricity sources or battery power.

To cover a large area, U.S. Pat. No. 4,964,331 to Halevy et al. discloses flying a mobile, radio-controlled airplane (drone) around an airport in a random pattern to scare away birds from runways. The drone is specially equipped with a receiver to control the launching of a special purpose cracker cartridge having a capsule which burns with a faint smoke trail for a predetermined period of time, after which the projected capsule explodes with a brilliant flash, loud noise, and a small cloud of smoke. While birds can be actually chased out of the path of a runway at an airport, this technique cannot assure access denial to areas around high values systems. Further, the device requires operator control from the ground which would represent a high manning demand in a busy large airfield. The RC airplane can be more effective in scaring birds from agricultural areas and can cover large areas in a fashion similar to crop duster planes.

A computer-based bird control system, as disclosed in U.S. Pat. No. 7,173,534 to Markham et al., utilizes audible noises from the structure to specifically repel, expel or prevent birds from landing on or nesting upon certain outdoor structures. In this regard, a structure-attachable impactor is used to create an acoustic impact noise similar to a whacking of a metal structure, such as an I-beam. The impactor is actuated at a random or a semi-random rate in addition to the playing of bird predator or other deterrent sounds maintained in audio files on the computer. Detection of the presence of a bird may be used as a trigger for the actuation of the impactor and/or predator/deterrent sounds. Although the use of computer controlled animal repellant/expulsion device as that due to Markham et al. allows a user to manipulate the system and/or alter the parameters it requires attendance and/or frequent manipulations.

Low frequency vibrations (60 Hz) are also used to induce animals to leave a particular area, without producing audible noises in U.S. Pat. No. 5,208,787 to Shirley. In this case, ultrasonic sound waves are produced by forming the solenoid rod of a ferromagnetic material, which is characterized by magnetostriction in the presence of an alternating magnetic field. The amplitude of sound wave vibration is intensified by selecting the length and diameter of the solenoid rod so that its natural frequency of vibration is in harmony with either the pulse frequency of the electromagnetic driving force, or alternatively, the frequency of ultrasonic sounds produced by magnetostriction. The sound wave generator circuit includes a pseudo-random signal generator for randomly gating the conduction of electrical alternating current through the solenoid coils during a pulsing duty cycle. Although indirect structure coupling of the vibrations to buildings, earth ground rods, and water/gas pipes carrying the vibrations, the coupling is electrical in nature and not vibrational. Otherwise, a very high amount of energy would be required to vibrate a building with sufficient energy for the building to act as a radiator. In contrast, in U.S. Pat. No. 4,414,653 to Shirley, a circuitry of the sound wave generator includes coils, which are pulsed with 60 Hz alternating current power, causes a solenoid bar to reciprocate and vibrate at a 60 Hz rate within a hollow spool. The vibrations produced by the solenoid bar are mechanically coupled to various sonic radiators, including the ground wire of an AC power distribution system.

In U.S. Pat. No. 4,414,653 to Pettinger, sound waves are generated by coils that are alternately energized and de-energized by a solid state control circuit. The circuitry includes two timing circuits which establish a three minute operating cycle during which the coils are energized at the desired 60 Hz for two minutes and are inactive for one minute. The sound waves are transmitted through the ground line of the electrical wiring system of a building or through the building itself in the case of a wall mounted unit.

The aforementioned sound bird repellants produce audible noises from the structure rather than from audio devices or files. Furthermore, the devices are designed to specifically repel, expel or prevent birds from landing on, roosting on or nesting upon certain outdoor/indoor structures. Structures that have components or equipment that are open to bird infestation are easily susceptible to damage from such bird infestation.

External stimuli are used to alert birds of danger and/or repel them from specific areas, as disclosed in U.S. Pat. No. 6,250,255 to Lenhardt et al., that include pulsing microwaves in order to induce dizziness, sound waves producing a vibration in a substrate to produce low frequency (50 Hz) tones or noise that are generally pulsed at less than 100 Hz and supersonic acoustic energy for causing a vibration and/or dizziness. These external stimuli may provide a reversible unpleasant sensation to the birds and other animals so that they will not only be repelled from a specific area, such as an airport, but also will avoid returning to such area. One such unpleasant sensation that is virtually harmless to the birds and other animals is the sensation of dizziness.

A radio wave system for repelling birds from aircraft, as disclosed in U.S. Pat. No. 7,106,216 to Maher, includes a directional radio wave transmitting rod, a frequency transmitter unit wired to the directional radio wave transmitting rod, and an activation switch in controlling connection with the frequency transmitting unit. The frequency transmitting unit generates and transmits radio wave signals, when the activation switch is in an on position, to the directional radio wave transmitting rod which emits a cone shaped radio wave signal in front of an aircraft. The cone shaped radio signal is emitted at a frequency detected by birds in flight which are deflected onto a flight path which avoids collisions between the birds and the aircraft. Further, for reduction of the potential of collisions of birds with aircrafts throughout the flight, U.S. Pat. No. 4,736,907 to Steffen describes producing light flashes by light sources installed on an aircraft and visible to the birds. The light flashing frequency is continuously increased one or more times in the 0.1 Hz to 3.0 Hz range and may then be maintained at the maximum frequency. Increasing the frequency of light flashes has been found to be more effective in causing an escape reaction in some birds and increasing the flash frequency for two separated light sources makes the vehicle appear to be moving closer at a high rate of speed increasing the acuteness of the escape reaction. A microprocessor-based control for the flashing lights permits storage of light flashing patterns permitting the flight crew to select one of the light flashing routines appropriate to the speed of the plane when a collision hazard is anticipated. The light flashing pattern is initiated either manually or automatically by radar, often while the crew is engaged in tasks related to taking-off and landing. The logistics of installing and operating bird deterrent flashing lights or any other bird repellent devices on an aircraft are complicated.

To ward off in-flight impact with birds, U.S. Pat. No. 5,270,707 to Schulte et al. describes the use of at least one light-flashes generating light source on an airplane, for which the frequency of the generated light flashes is varied through at least one cycle. The flash frequency is varied dependent upon the speed and/or the altitude and/or the acceleration of the airplane in order to provide an optimal flash frequency range for all take-off and landing phases and at the same time is independent of the load and the type of airplane. Apparently, birds viewing the flashing lights may tend to change their course to avoid collision since flying birds will not knowingly collide with an aircraft if the presence of the aircraft is indeed communicated to the birds by the lights. However, the lights may not be seen by the birds because visibility is diminished due to inclement weather or the birds may not be looking at the aircraft (and thus at the lights) or perhaps while searching for food, they are viewing predators including other birds.

Since birds' eyes are sensitive to both ultraviolet and visible lights, U.S. Pat. No. 6,625,918 to Bhullar discloses a control unit causing a laser beam of a wavelength seen by birds to sweep a field in vertical and horizontal patterns to merely frighten birds away rather than blinding them. The patterns and speed of the scanning device are variable. The range of wavelengths of the laser light beam is preferably from about 432 nanometers to about 633 nanometers. The device is powered by a rechargeable gel pack battery. However, in a subsequent disclosure, U.S. Pat. No. 6,718,681 to Bhullar, a solar panel system is used for recharging the batteries and photocell controlled switches are used for operation; thus, eliminating the need for human, manual on-off switching.

A device to repel and disperse waterfowl entering a proscribed area is disclosed in U.S. Pat. No. 7,506,815 to Spiegel, that consists of a laser beam generator and a photoelectric switch to activate the device only from dusk to dawn. Further, an approach for repelling Canadian geese, as disclosed in U.S. Pat. No. 7,699,018 to Wells, includes a nightly activated solar-powered, photocell controlled flasher (a strobe or flashable light, preferably an L.E.D. light for longevity) producing a repeating flash frequency every second, for disposition on where geese inhabit. The method includes the steps of intermittently flashing a light into an area where geese sleep, and disturbing the geese from rest. In addition, a hazard avoidance system that can, with minimal manual intervention, select and initiate an optimal light illumination routine that is effective to attract the attention of and repel an anticipated collision bird threat is disclosed in U.S. Pat. No. 6,940,424 to Philiben et al.

In U.S. Pat. No. 6,793,364 to Cramer et al., a non-lethal visual system for dispersal of nuisance birds from a preselected area is based on U.S. Pat. No. 6,575,597 (also to Cramer et al.) and other laser security devices, which employ light sources at any narrow wavelength band between 400 and 700 nm (the entire visible light spectrum from blue to red) and provide either continuous or repetitively pulsed (on-off flashing) intense light directly from a laser diode source or from light emitting diodes (LED's). The system employs laser devices suitable for use as a bird dispersal device, either hand held or mounted to an unmanned automated scanning device with the intention to disrupt activities such as the steady flow of safely moving aircraft on runways and adjacent thereto.

Self-contained non-lethal security devices include compact high power laser dazzling devices according to Casazza in U.S. Pat. No. 7,239,655 and the use of laser or light-emitting diode (LED) light in a continuous or a flicker mode of two wavelengths at opposite ends of the visible spectrum (e.g., red and green) in order to provide a glare or flash-blinding visual effect as in U.S. Pat. No. 6,190,022 to Tocci et al.

U.S. Pat. No. 4,769,794, to Beuter et al. describes scaring birds by discontinuous emission of acoustic, frequency-modulated signals of limited duration either in fixed or in arbitrary sequence. The signals comprise bird sounds synthetically generated from the frequency spectrum of pulse-controlled audio generators. The frequency of repetition of the bird sounds is controlled by clock pulses. Various animal sounds are programmed to prevent habituation of the birds to the very same sounds.

Most sound deterrent/expulsion devices employ sound waves having frequencies that are considered offensive to the animal, such as ultrasound or sonic energy within the hearing range of the birds and other animals. Often times, ultrasonic animal deterrent systems utilize a single frequency. While the selected frequency is chosen to have a deterrent effect, the constant frequency can fail to get the attention of the animal. Furthermore, the use of a single frequency does not contemplate variations in the species, potentially limiting the effectiveness of the animal deterrent system. Accordingly, sound deterrent devices that generate varying-frequency ultrasonic emissions have been introduced while different repellent/expulsion devices utilize different tactics. This has resulted in the development of an assortment of active bird repellant devices, including devices that use sound stimuli for deterring or expelling birds from specific areas.

Sound devices typically rely upon periodic generation of noises or sounds to either cause panic or fear or to induce a discomfort sensation in the birds in order to deter or expel them from the area to be protected. Scaring birds and causing them to panic in fear of their life lead to erratic behavior that may cause more damage to the structure or equipment in the area to be protected and will most likely result in bird kills or injuries.

The use of electromagnetic (EM) energy to warn birds (specifically pigeons) will have no deterrent features per se. However, the bird's tissue is heated when the impinging energy is absorbed causing stimulation of the ears. Use of microwave energy to alert and ward off flying birds of impending danger is disclosed in U.S. Pat. No. 5,774,088 to Kreithen, wherein a hazard warning system radiates controlled pulses in the frequency range of 1 GHz to about 40 GHz lasting from about 5 µs to about 25 µs in duration. The average power level of the microwave energy is in the range 1 mw/cm$^2$ to 10 mw/cm$^2$, taking into consideration environmental safety. The pulsed source of microwave energy is coupled to a microwave antenna that emanates the warning radiation. A proximity detector can enhance operating efficiency by steering the antenna toward a detected target. Further, the warning system can remain in a standby mode until alerted by the proximity detector to the presence of target birds, where upon the warning system begins to output pulsed microwave energy. Microwaves induced clicks in the avian auditory system but would be perceived only as a clicking or buzzing sound within the head of the bird. The microwave radiation sensed by the bird's auditory system may cause them to veer from a collision course. The pulse control circuitry may be programmed to generate complex pulse trains that can evoke a biologically significant response within recipient birds. The attention-grabbing benign warning is transparent to humans and is communicated to the birds at the speed of light, without regard to visibility conditions or ambient acoustic noise, and without regard to whether the birds happen to be looking toward the protected area. Supplemental hazard-warning radiation may be employed, including ultraviolet light and infrasound. Although reference to infrasound as secondary emission was mentioned, the means of producing or the impacts of infrasound are not specified.

Other than literature citations hereinabove, the only known disclosure that addresses the innate navigational system is U.S. Pat. No. 6,690,265 to Hagstrum that discloses the continuous broadcast of an infrasonic signal to alert night-migrating birds to obstacles such as buildings and communication towers. The signal mimics natural topographic obstacles or lightning strikes that birds avoid naturally, due to the workings of their innate navigational system.

Most devices have had only limited or partial success, since birds ignore the presence of the device after adaptation to it. Further, some methods soon become ineffective because birds quickly habituate to a steady stimulus often leading to trapping or destruction of birds as a last resort. In recent years, other approaches have been devised, all having their own shortcomings to a varying extent. Currently used audio deterrent systems are only marginally effective and no successful research has yielded any viable avian denial system.

Accordingly, there is a need to expand the application of infrasonic signals as the primary avian deterrent signals in airports and airfields at all times and expanding the signals to encompass combinations of signals corresponding to the atmospheric infrasound waves that travel long distances without attenuation and which represent topographic features (i.e. navigational cues) and climatic change features that constitute stimuli to birds.

Since the majority of the prior art lean towards scaring and startling tactics whether using active or static avian repellents to deter birds from colliding with moving objects or man-made structures, without careful examination to the fact that migration birds traverse thousands of miles without inter-collisions between species or collision with natural objects, such as tall trees or high mountains. This is in spite of the fact that most deterrent approaches are based on analysis of natural phenomena that tend to scare off birds and disrupt their habitats. None of the prior art references, as referenced above, disclose the use of an active non-lethal avian denial infrasound system, in consistent with the features of the claimed invention, that includes the following features: (a) the establishment of a bird free zone encompassing the airfield proper and the air space, which are used for takeoff and landing, (b) a noise barrier to reduce the sound waves generated in the bird free zone, (c) an exclusion area around the airport, which are deprived of any structure that may attract birds for roosting and of material that may attract birds seeking food, and (d) an area that provide the birds with food and shelter. Also, there is no disclosure of the use of infrasound means for active control of the noise emanating from the airfield to the exclusion area.

The active non-lethal infrasonic avian denial system, according to the invention, includes an infrasound active bird-free zone that covers the critical areas around aircrafts and other high value systems that generate active infrasound signals via infrasound generators of relevance to the bird population that pose threat to the air traffic.

In one aspect of the invention, a plurality of in-phase infrasound generators are used to create an infrasound active bird-free zone that deny access to birds and out-of-phase infrasound generators are used to create infrasound-free dead zones that allow access to the birds being repelled from infrasound active bird-free zone.

In another aspect of the invention, the infrasound active bird-free zone is surrounded by an infrasound cancellation barrier formed by an active infrasound control system that cancels all continuous and intermittent infrasound signals emitted at the perimeter of the infrasound active bird-free zone.

In yet another aspect of the invention, a plurality of infrasound signals are used to create interference patterns such that the airport runways and preferably the airside of the airfield will be within a infrasound active bird-free zone, and portions of the surrounding areas will be infrasound-free dead zones.

In another aspect of the invention, the infrasound active bird-free zone is excluded from the infrasound-free dead zones by a barren exclusion zone that is deprived from any avian life sustenance.

In a further aspect of the invention, the airport proper including airspace and land space is part of the active zone.

In another aspect of the invention, one of the extended infrasound-free dead zone may include a bird sanctuary serving as a refuge for birds being repelled from the infrasound active bird-free zone.

In yet another aspect of the invention, an infrasound active bird-free zone is created as needed covering the entirety of the airspace portion of the airfield leaving dead zones in its wake.

In another aspect of the invention, whenever the presence of birds is detected an active zone is created covering the entirety of the airspace portion of the airfield leaving dead zones in its wake.

The active non-lethal avian infrasound system is based on the exploitation of signals that mimics natural navigational cues to jam the avian navigational system in order to drive birds away from their roosting locations. It may prevent all forms of damage to aircraft and airport facility including those caused by birds nesting and perching in unwanted areas. It may be effective in all anticipated ranges and altitudes of encountering birds and to a wide variety of avian species, especially those that can cause costly damages to aircraft. It may repel birds in critical areas around aircraft and other high value system, which operates at different weather conditions. It is an avian denial system that may need low manning requirements and capable of working intermittently or continuously for extended duration. It is also a system that may be easy to deploy and install at airfields and around facilities that have high concentrations of birds in areas that pose a threat to aircraft from bird-strikes and/or aircraft/facility damage. It may also be capable of detecting birds flying into an area where there is the potential for collision with an aircraft or may work in concert with other avian detection systems such as radar systems.

The active non-lethal avian infrasound system of the invention is based on the inventive appreciation of the following facts: (a) infrasonic signals travel thousands of miles in the atmosphere with little attenuation. However, shadow zones wherein the signal are greatly attenuated may be formed due to lifting of the wave front by wind velocity gradient or by a vertically decreasing temperature; (b) the avian navigational map indicates that birds use infrasonic map cues radiated by steep-sided topographic features to navigate over great distances (hundreds to thousands of miles); (c) birds have extremely sensitive low-frequency hearing range; (d) like human and mammals, birds' sensation of infrasound is not limited by the size and anatomy of their hearing organs since the vibration induced by infrasound is sensed by all body parts; (e) birds in flight react to and move away from artificially-generated thunder sounds; (f) birds have the unique ability to safely navigate without collisions through mountain valleys, rifts, hillsides, ridges and passes under conditions of limited visibility, since they are able to detect the infrasound radiated by the underlying topography; (g) terrestrial birds avoid flying over large bodies of water most likely because the surface waves generate loud infrasound capable of jamming the birds' acoustic navigational system; (h) certain infrasound signals attract birds in a similar fashion to attracting sea animals and pests; (i) the pitch of infrasound generators can be adjusted to radiate infrasound at frequencies similar to those radiated by natural topographic features (avian navigational cues) as well as the infrasound generated by weather disturbances such as of thunder and lightning strikes and by microbaroms with periods in the 5-7 second range (0.20-0.14 Hz), microseisms, thermals formations and other natural phenomena; (j) active and dead sound zones can be created by using multiple infrasound generators to create interference patterns, some constructive (active zones) and some destructive (dead zones); (k) interference patterns using multiple acoustic wave sources are fairly well established science; and (l) state-of-the-art active noise control allows the cancellation of sound radiated from a specific area, especially low frequency sound waves.

In one embodiment of the invention, a plurality of in-phase infrasound generators may be used to develop a constructive interference pattern between the radiated infrasound waves for creating an infrasound active zone within the airspace portion of the airfield. Simultaneously, a plurality of out-of-phase infrasound sources creates destructive interference patterns to provide dead zones away from the air traffic strip. Birds deterred from the active zone tend to veer away from the active zone and seek a safe refuge in the dead zones.

In another embodiment of the invention, a plurality of infrasound generators may be used to broadcast a plurality of continuous and intermittent infrasound signals that (1) mimic features of atmospheric infrasound that either drive birds to evacuate a location, e.g., the sound of lightning, thunderstorms, sonic booms, etc., or (2) mirror infrasonic emissions from natural obstacles that cause birds to innately avoid certain locations and chose specific safe flight paths. The plurality of continuous and intermittent infrasound signals include signals with a wide spectrum of frequencies and sound pressure levels (SPL) compatible with local avian species as well as migratory birds. By creating a constructive interference pattern between the radiated infrasound waves within the airspace portion of the airfield, all avian species can be easily denied access to the created infrasound active zone without causing any harm or fatality among them. Additionally, a plurality of infrasound generators may be located at the peripheries of the active zone to radiate infrasound signals for canceling all infrasound propagating outside the perimeters of the active zone and creating an infrasound barrier that separates the bird-free active zone from the surroundings such that local and migration birds can roam freely without the annoyance of the infrasound alarming signals. On the other side of the barrier, birds can assume their normal routine typical of the environment and topography surrounding the airfield or airport, wherein birds are free to fly around, roost, perch, breed and nest, dependent on the topography and structures surrounding the airfield.

Another embodiment of the invention involves the use of a plurality of infrasound sources to create constructive interference patterns such that the airport taxiways, runways and, preferably, the whole airside of the airfield will be within a bird free active zone. An infrasound radiation cancellation barrier surrounding the airspace may provide quiet surroundings outside the airfield. At some distance from the infrasound barrier, a plurality of out-of-phase infrasound generators create destructive interference patterns to provide dead zones. Birds deterred from the active zone tend to veer away from the active zone and seek a safe refuge in the dead zones. This avian denial system configuration assures that migratory birds will not engage in erratic behavior by access denial in the airspace within the active zone to cause any collision with road traffic in the vicinity of the airfield.

In a further embodiment of the invention, an additional level of defense is provided. The active bird-free zone and the infrasound barrier are excluded from the surroundings and the dead zones by an exclusion area or exclusion strip of land deprived from any avian life sustenance and is basically infrasound-quiet zone. In the exclusion area, stray birds may fly, but deprived from all survival needs. This would allow for creation of dead zone in the proximity of the said active zones. Such arrangement may be well suited for airfields in areas populated with migratory birds such as marsh lands and forested regions and may be appropriate if the airfield is in a location with ample free space.

The active non-lethal avian infrasound system of the invention also provides that the active zone encompasses the airport proper including airspace and land space. Since infrasound waves typically have very large wavelengths (17 m and above) and they travel for large distances with very little attenuation, the active zones may be created to blanket the entire airport. This may eliminate the potential of birds seeking refuge in critical areas in the airfield wherein they can roost or nest, causing damage to critical assets. The infrasound barrier may be constructed to enclose the whole airport to establish a quite zone for the adjacent neighborhood. The dead zones can be expanded as well to encompass extensive spreads of land dependent on the demography and topography of the land stretch around the airport.

In another embodiment, the active non-lethal avian infrasound system of the invention includes an active bird-free zone, an infrasound barrier, exclusion strips and an expanded dead zone outside the premises of the airport proper, wherein one or more wild life sanctuaries may be established to attract birds experiencing discomfort close to the active zone. The wild life refuge may be furnished with amenities to attract birds including feed and landscape appropriate for flying around, roosting, perching, breeding and nesting. Attraction of birds to the sanctuaries can be enforced by surrounding the area with a plurality of infrasound sources broadcasting the infrasonic portion of bird calls (including whichever species we wish to attract) this could, like the classic duck decoy, lure the subject birds to head for the apparent flock. By broadcasting the infrasonic portion of mating calls (species specific) one might attract birds toward the source.

An alternative avian infrasound system according to the invention may be tailored for the creation; on as need basis, of an active zone covering the entirety of the airspace portion of the airfield using a plurality of small acoustic elements. Each of the plurality of the acoustic elements are pulsed individually to provide infrasound signals. By varying the timing, each acoustic elements are pulsed one by one in a sequence along a row, to set up a pattern of constructive interference waves that collimate in a beam at a set angle. The beam can be steered electronically; like a search-light, across a region of interest creating temporary active zones. The created temporary active zone leaves the infrasound-free dead zones in its wake, safe and comfortable for deterred birds to find refuge therein. The plurality of small acoustic elements may broadcast the necessary avian infrasound signals or additional infrasound generators may be added to produce signals tailored for the bird species which are likely to be present in the airfield In another embodiment of the invention, a plurality of infrasound detectors may be included in the infrasound system and may be capable of detecting birds flying into the vicinity of the airfield or in an area wherein there is a potential for collision with an aircraft. The infrasound detectors may work in concert with other avian detection systems such as radar systems. When the presence of birds is detected in an airport area or runway, an active bird-free zone covering the entirety of the airspace is momentarily created by a plurality of small acoustic elements, pulsed individually in sequence to provide infrasound signals tailored for repelling the detected bird species. The created temporary active zone leaves the infrasound-free dead zones in its wake, safe and comfortable for deterred birds to find refuge therein.

The active non-lethal avian infrasound system of the claimed invention offers several advantages. It does not target a single bird or a flock of birds, but targets an area (called an active zone) that would be very uncomfortable for the birds, and the birds would be encouraged to move to areas that have very low, or no, infrasound signatures (called dead zones). The infrasound system of the invention provides a creation of an active zone that may be squarely placed on the airport runways (in 3 dimensions). The infrasound system, according to the invention, may be most efficient for migratory birds, which are most responsible for intensification of the bird-aircraft strike problems and subsequently would encompass a large percentage of birds that pose serious threats to aircrafts. As mentioned above, the infrasound system according to the invention, may work in concert with various avian detection systems such as radar systems and provide infrasound presence detection capabilities.

Hereinafter, the invention will be described more specifically by way of examples. It is to be noted, however, the invention is by no means limited to these examples.

EXAMPLES

The basic principles of the invention are shown in FIG. 1 wherein birds are denied access to the runway 12 by creating an infrasound active zone 2 that engulfs the runway 12, which does not necessarily cover other airport facilities 11 in the airport 1. The infrasound active zone 2 may be created by means of a plurality of infrasound generators 21 to collectively form a constructive interference pattern that can inundate the infrasound active zone 2 with infrasound waves of different frequencies and pressure levels. Each of the plurality of infrasound generators 21 can be specially designed to produce a selected myriad of infrasonic signals that may mimic a variety of warning atmospheric infrasound features that cause birds to avoid navigational "blind" zones or central locations of dangerous weather development, due to the workings of their innate navigational system. The plurality of infrasound generators 21 may be customized Thigpen Rotary Woofers produced by Eminent Technology of Tallahassee, Fla., U.S.A. or their equivalents.

To avoid erratic behaviors from the birds being repelled from the airfield two infrasound-free dead zones 3 and 4 may be created close by the infrasound active zone 2 through the generation of destructive interference patterns of infrasound signals. As illustrated in FIG. 1, the infrasound-free dead zone 3 may be created by a plurality of sound generators 31 and a plurality of out-of-phase sound generators 32. The sound generators 31 and the plurality of out-of-phase sound generators 32 may be 180° out-of-phase. Similarly, the infrasound-free dead zone 4 may be created by a plurality of sound generators 41 and a plurality of out-of-phase sound generators 42. The sound generators 41 and the plurality of out-of-phase sound generators 42 maybe 180° out of phase. Accordingly, a single bird or a flock of birds attempt to enter the infrasound active zone 2 would be very uncomfortable, and would innately move to either the infrasound-free dead zone 3 or the infrasound-free dead zone 4, both being areas of very low, or no infrasound signatures. The infrasound generators 31, 32, 41 and 42 may be customized Thigpen Rotary Woofers and produced by Eminent Technology of Tallahassee, Fla., U.S.A. or their equivalents.

Figure 2:
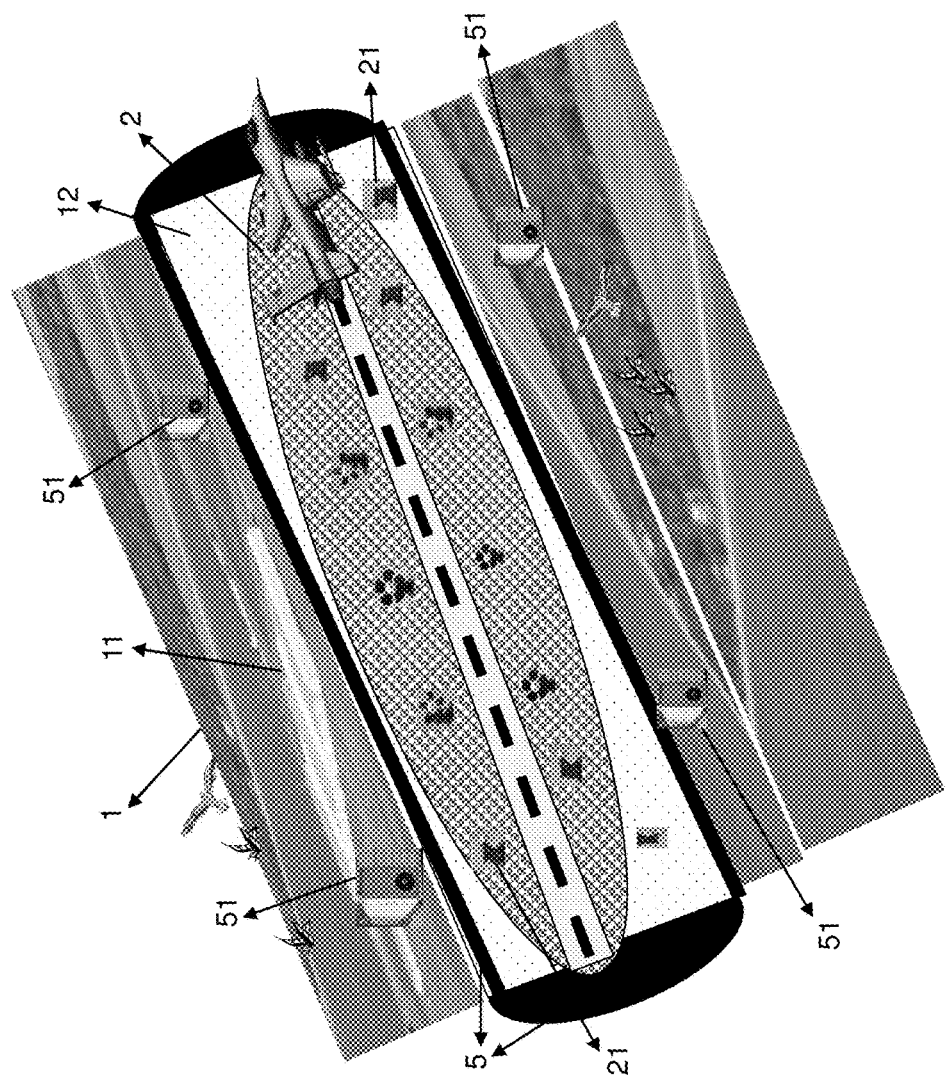
FIG. 2 is a schematic of an airfield protected from avian access by an infrasound active zone (2) created by infrasound generators (21) through generation of constructive infrasound wave patterns and an active infrasound barrier (5) created by infrasound signals cancellation generators (51) surrounding the infrasound active zone (2)

FIG. 2 shows another embodiment of the invention appropriate for an airfield with light air traffic or private airports for small single-engine planes, wherein migratory birds and local birds pose a threat to aircrafts. Similar to the system of FIG. 1, the runway 12 in FIG. 2 is protected from avian threats by the infrasound active zone 2 using infrasound generators 21. However, the infrasound-free dead zones (3 and 4) may be eliminated in favor of creating an infrasound cancellation barrier 5 that surrounds the infrasound active zone 2. By using well known active noise control means, the plurality of quieting infrasound generators (51) that radiate a plurality of infrasonic signals that can cancel all the plurality of continuous and intermittent infrasound signals radiating at the perimeter of the infrasound active zone (2). An example of an infrasound generator 51 that have quieting features is the customized Rotary Woofers developed for similar purposes by Eminent Technology of Tallahassee, Fla., U.S.A. or their equivalents.

Figure 3:
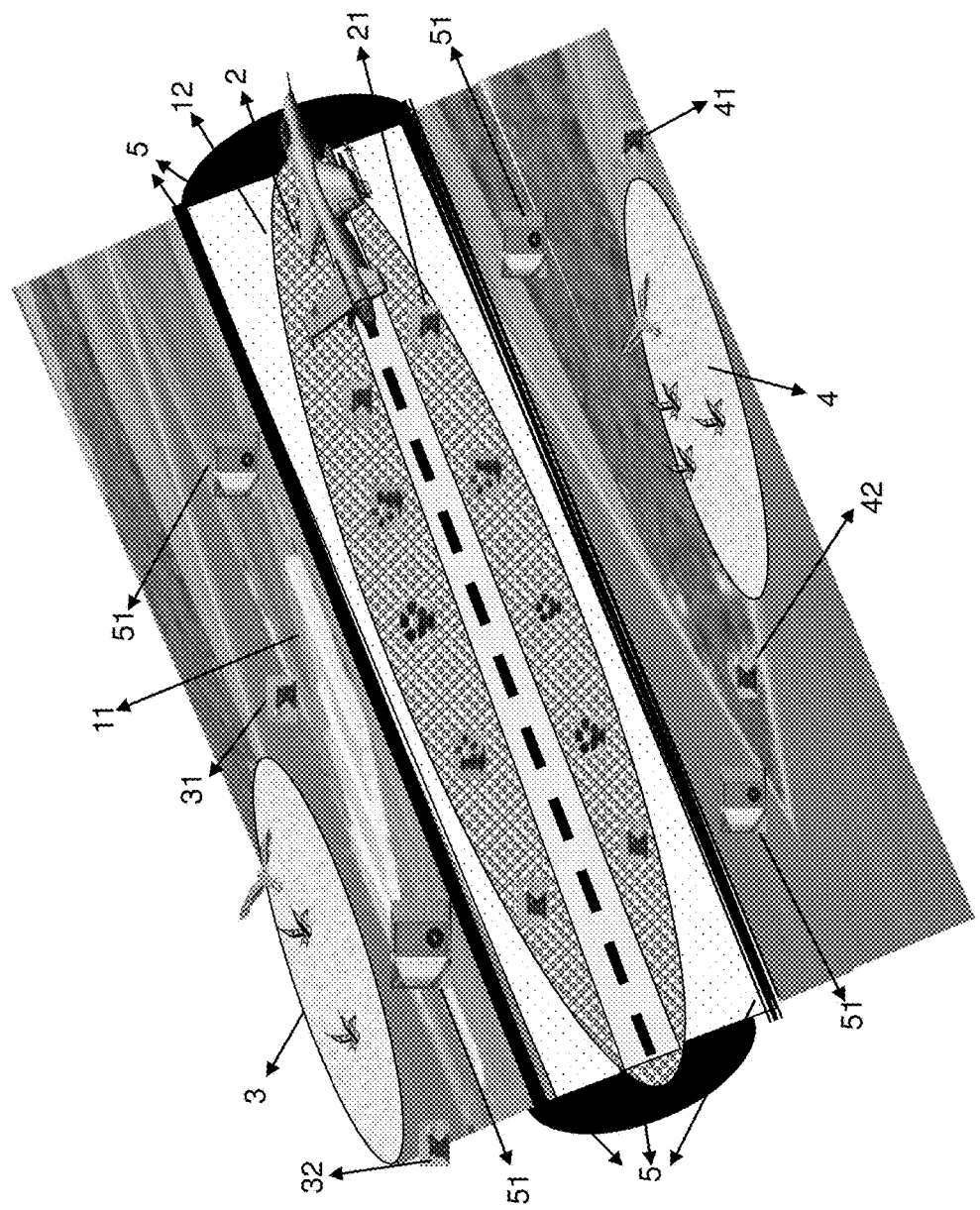
FIG. 3 shows the system of FIG. 2, with the addition of two infrasonic-free dead zones (3 and 4)

An alternative embodiment of the invention is shown in FIG. 3, wherein the runway 12 is protected from avian threats by the infrasound active zone 2 using a plurality of in-phase infrasound generators 21. The perimeters of the infrasound active zone 2 are surrounded by the infrasound cancellation barrier 5 created by a plurality of quiet infrasound generators 51. Furthermore, an infrasound-free dead zone 3 may be created at a distance from the infrasound active zone 2 and the airport facilities 11 by a plurality of sound generators 31 and a plurality of out-of-phase sound generators 32. On the other side of the infrasound active zone 2, a second infrasound-free dead zone 4 may be created by a plurality of sound generators 41 and a plurality of out-of-phase sound generators 42.

Figure 4:
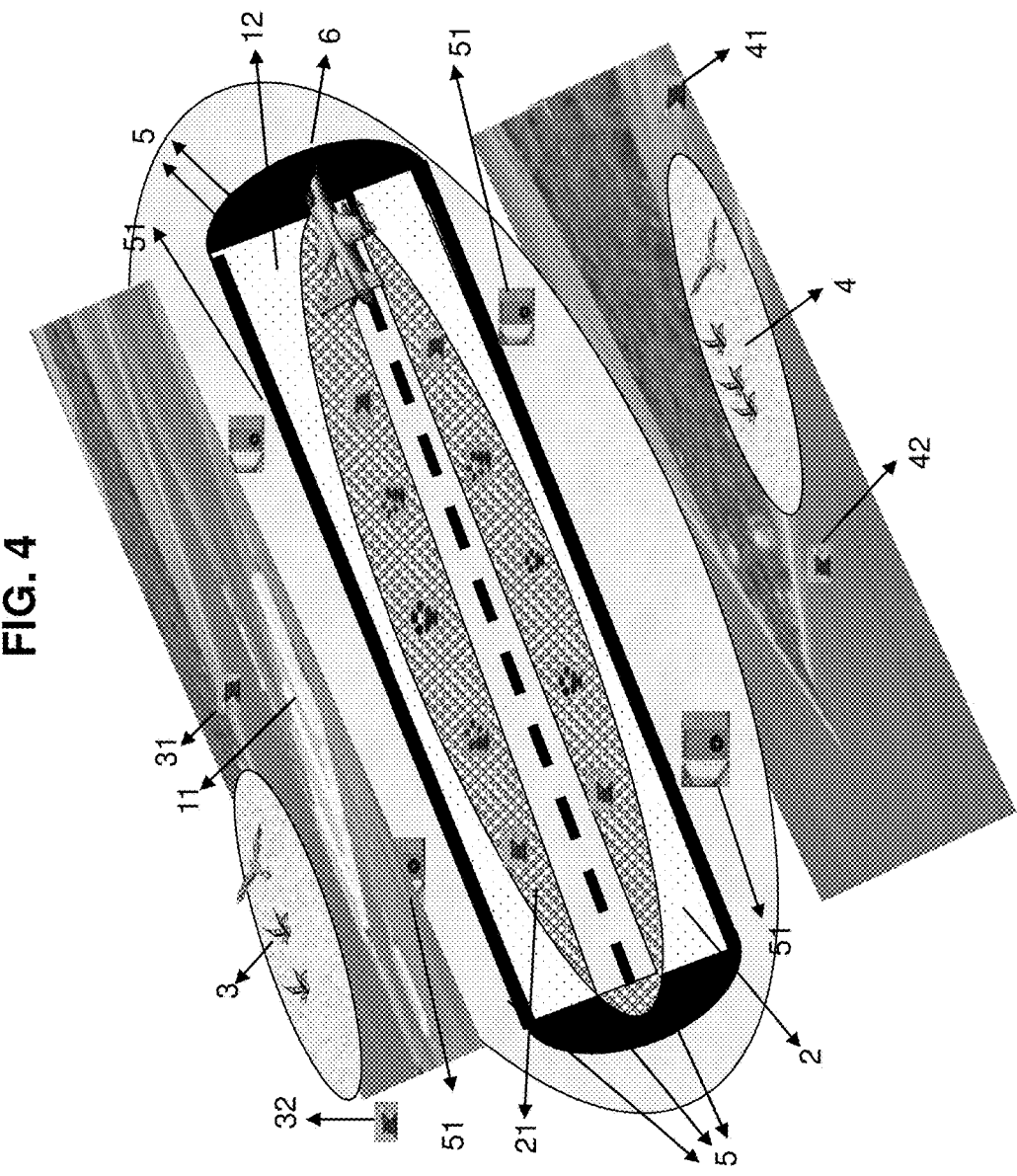
FIG. 4 illustrates the addition of an exclusion strip (6) to the system of FIG. 3.

In FIG. 4, both infrasound-free dead zones 3 and 4 may be separated from the infrasound active zone 2 by a barren exclusion strip 6. The barren exclusion strip 6 may be covered with gravel and sand or artificial grass and kept in a condition that does not attract birds to habituate or roost.

Figure 5:
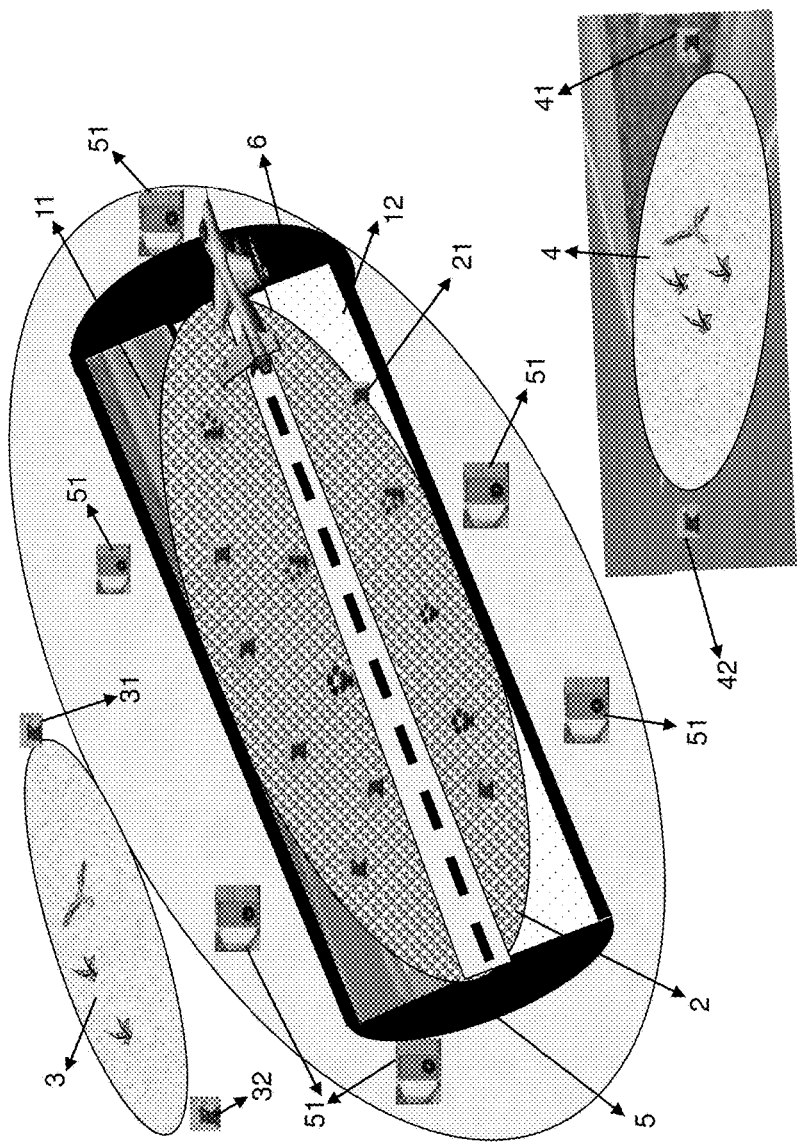
FIG. 5 shows a schematic airport protected from avian access by an infrasound active zone (2), an active infrasound barrier (5) created by infrasound signals cancellation generators (51) surrounding the infrasound active zone (2) and an exclusion strip (6) that separates the airport from the surrounding area and the creation of two infrasonic-free dead zones (3 and 4)

The infrasound active zone 2 may be extended to cover all the premises in airport 1 including facilities 11 or land space portions and the runway 12 or the airspace portion as shown in FIG. 5.

An active non-lethal infrasound system that drive birds to frantic reaction may lead to a chaotic erratic behavior causing more bird-aircraft collisions while navigating birds away from critical assets and leading them to a sanctuary or diverting the navigation path of the leader of a flock of migrating birds and courting them away from critical areas around aircraft and other high value systems is much safer to the assets, facilities and the birds.

Figure 6:
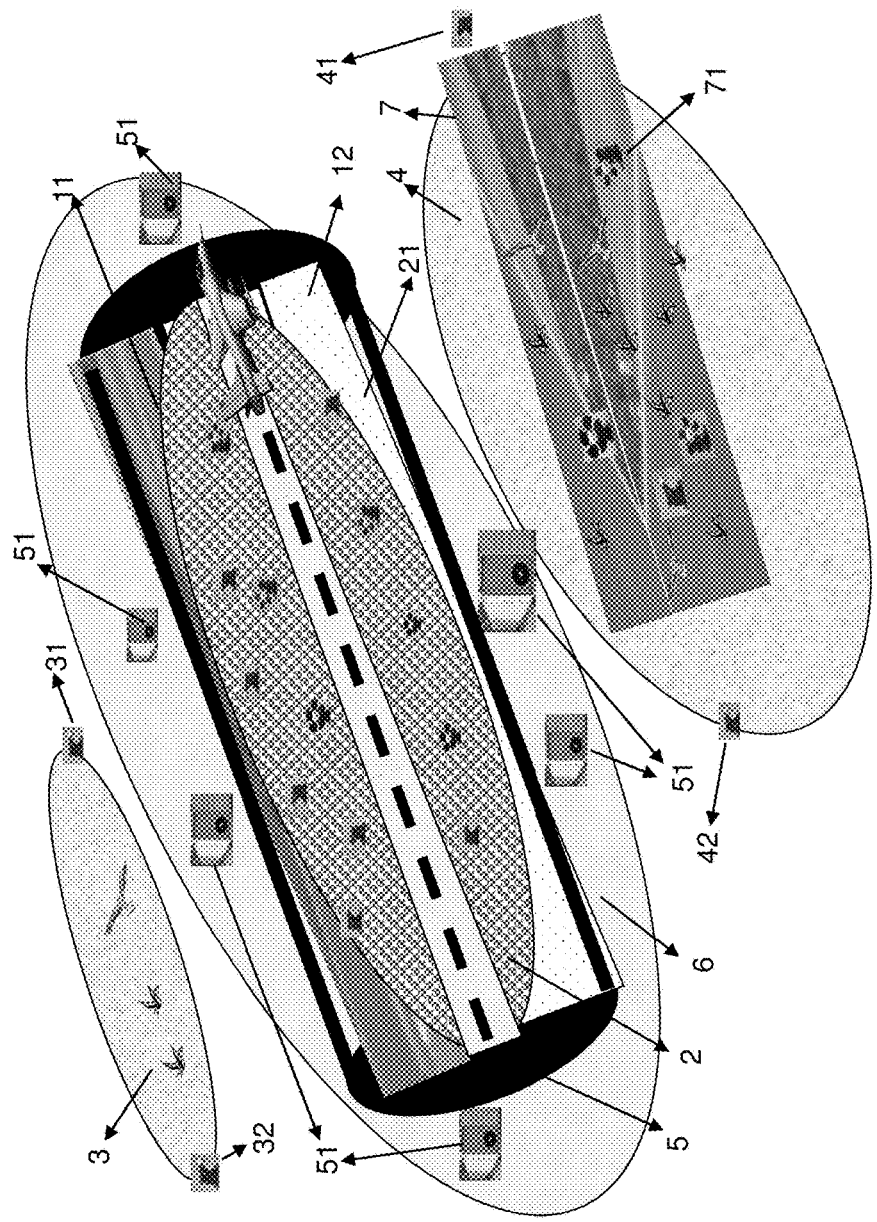
FIG. 6 is similar to FIG. 5 with the construction of a wild life refuge or bird sanctuary (7) in one of the infrasound-free dead zones (4)

A further embodiment of the invention is demonstrated in FIG. 6, wherein a combination of "carrot and stick" approach is employed. Here, the birds may be repelled from critical areas and attracted to safe sanctuaries. As an example, the infrasound-free dead zone 4 is expanded for establishment of a wildlife refuge or a bird sanctuary 7 that can be further away from the airport 1. The bird sanctuary 7 may be furnished with feed, water, shrubs and bushes to provide an attractive habitat for local birds and migration birds. To further attract birds to the sanctuary, a plurality of infrasound generators 71 may be used to mimic mating calls of the species of interest.

Figure 7:
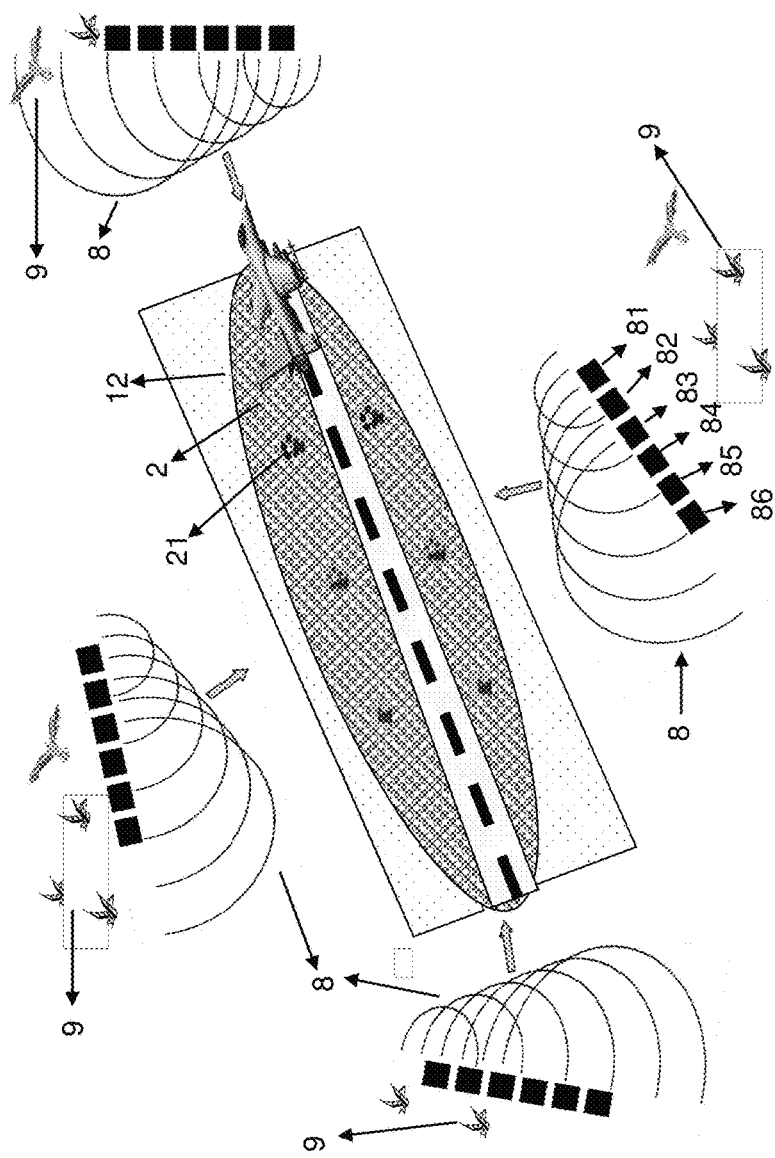
FIG. 7 shows an active non-lethal infrasound system, wherein a plurality of small acoustic elements (8) are pulsed one at a time in sequence to generate a constructive pattern of infrasonic waves that collimate in a beam at a set angle for the creation of a plurality of infrasound active zones (2)

In smaller commercial airports where radar is unavailable and infrequent flights are occasional, an active non-lethal infrasound system as shown in FIG. 7 may be suitable and more appropriate. As described in FIG. 7, a plurality of pulsating infrasound generators broadcast a pattern of constructive waves by means of a plurality of small acoustic elements 8. Each of the plurality of the small acoustic elements 8 is pulsed one by one in a sequence along a row, to set up a pattern of constructive interference waves that collimate in a beam at a set angle for creation of the infrasound active zone 2. For example, the acoustic element 81 is pulsed first, and emits a pressure wave that spreads out like a ripple on a pond (largest semicircle); the acoustic element 82 is pulsed next, and emits a ripple that is slightly smaller than acoustic element 81 because it was started later; then the acoustic elements 83, 84, 85 and 86 are pulsed consecutively until all the acoustic elements have been pulsed. The multiple waves add up to one single wave front travelling at a set angle. In other words, the beam angle can be set just by programming the pulse timings. The beam can be swept like a search-light across a region of interest momentarily creating the infrasound active zone 2. Additionally, a plurality of infrasound generators 21 may broadcast infrasound signals tailored for the bird species which are likely to be present in the airfield. The created infrasound active zone 2 leaves dead zones 9 in its wake, safe and comfortable for deterred birds to find refuge therein.

Figure 8:
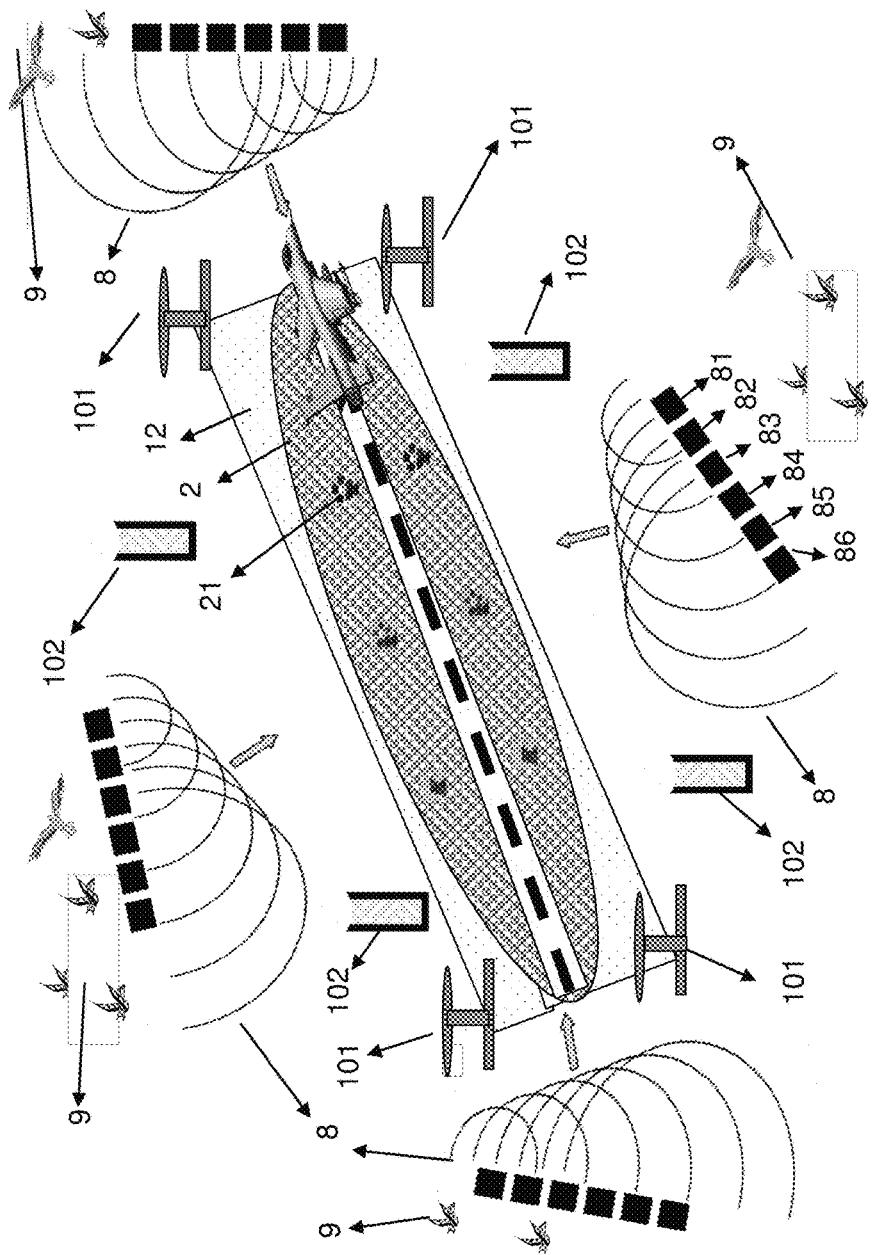
FIG. 8 shows an active non-lethal infrasound system similar to the system of FIG. 7 with the additional provision of a plurality of infrasound detectors (101) that activate the system and work in concert with a plurality of radars (102).

In FIG. 8, a plurality of infrasound detectors 101 may be provided to detect the presence of birds within the proximity of the airstrip or runway 12. Upon detection of the birds' presence in the airport area, bird-free infrasound active zone 2 covering the entirety of the airspace is momentarily created using the active non-lethal infrasound system described in FIG. 7. Each of the plurality of the small acoustic elements 8 may be pulsed individually one at a time in a sequence along a row, to set up a pattern of constructive interference waves that collimate in a beam at a set angle to create a temporary infrasound active zone 2. The plurality of infrasound detectors 101 include infrasound detectors capable of detecting birds flying into the vicinity of the airstrip or runway 12, where there is a potential for collision with an aircraft that detected the motion of the birds. Infrasound detectors can be one or more of the different detectors available, e.g., the ½" free-field precision condenser microphone Type 40AZ for low-frequency/infrasound measurements in open acoustic fields by the Danish company G.R.A.S. (distributors in Twinsburg, Ohio); Chaparral by the Division of the Geophysical Institute, University of Alaska, Fairbanks; Ak.; Seattle Q1 Infrasound Microphone developed by the Geology Department at Southern Methodist University, Texas; Presence Detector by Extronic Elektronik AB; Norsonic; Sniper Acoustic Detection System (SADS); the advanced 1-10 Hz optical fiber infrasound sensor (OFIS) developed by the Institute of Geophysics and Planetary Physics (IGPP) Gravity Lab at the Scripps Institution of Oceanography, California; or a customized Microbarograph or their equivalents. A myriad of infrasound detectors have been developed to test compliance to the Comprehensive Nuclear Test Ban Treaty (NTBT). Those are in the higher pass band, that are from about 0.05 to 10 Hz for detecting close and relatively small events to listen for low yield atmospheric nuclear weapons testing. The plurality of small acoustic elements 8 may be connected into or act in concert with a plurality of radars 102, e.g., the existing Doppler radar. This type of active non-lethal infrasound denial system, in accordance with the features of the invention, may be used to clear the air space when the plurality of radars have detected birds in the area prior to a take-off and/or landing. Such active non-lethal infrasound system may be operated more or less for two hours per month and may run a few minutes at a time.

While the invention has been described with references to several embodiments, it will be appreciated by those skilled in the art that the invention may be practiced otherwise than as specifically described herein without departing from the spirit and scope of the invention, It is, therefore, to be understood that the spirit and scope of the invention would be limited only by the appended claims.

What is claimed is:

1. An active non-lethal infrasound system for denying birds access to predetermined areas, comprising:
a plurality of first infrasound generators positioned in at least one predetermined first area, the plurality of first infrasound generators operable to radiate overlapping infrasonic waves that interfere with each other to form a plurality of constructive interference patterns to thereby create an infrasound active zone in the at least one predetermined first area; and
a plurality of second infrasound generators positioned in at least one second area at a perimeter of the infrasound active zone, the plurality of second infrasound generators operable to radiate infrasonic waves that interfere with each other to form a plurality of destructive interference patterns to thereby create one or more infrasound-free dead zones in the at least one second area, which are outside the domain of the at least one predetermined first area and which provide a refuge for birds being repelled from the infrasound active zone.

2. The active non-lethal infrasound system of claim 1, wherein the constructive interference patterns of infrasonic waves mimic a plurality of navigational cues and natural weather conditions that repel birds from the infrasound active zone.

3. The active non-lethal infrasound system of claim 1, wherein the infrasound active zone is positioned within an airspace portion of an airfield.

4. The active non-lethal infrasound system of claim 3, further comprising a barren exclusion zone that is positioned to surround at least part of the infrasound active zone.

5. The active non-lethal infrasound system of claim 4, wherein the barren exclusion zone is deprived of any avian life-sustenance amenities and constitutes a no-fly bird zone and is not connected to the one or more infrasound-free dead zones.

6. The active non-lethal infrasound system of claim 4, wherein the barren exclusion zone extends to surround at least one of the plurality of second infrasound generators.

7. The active non-lethal infrasound system of claim 3, wherein the infrasound active zone is expanded to encompass all areas in an airport including critical areas around aircraft and other high value systems.

8. The active non-lethal infrasound system of claim 1, wherein at least some of the infrasonic waves are radiated in a frequency range of 0.20 to 0.14 Hz.

9. An active non-lethal infrasound system for denying birds' access to predetermined areas, comprising:
a plurality of first infrasound generators that each radiate a continuous and intermittent infrasound signal, the plurality of first infrasound generators positioned in at least one predetermined first area, and the continuous and intermittent infrasound signals from the plurality of first infrasound generators interfere with each other to create an infrasound active zone for repelling birds; and
a plurality of second infrasound generators that each radiate signals that cancel the continuous and intermittent infrasound signals radiating at a perimeter of the infrasound active zone by interfering with the continuous and intermittent infrasound signals to create an infrasound cancellation barrier for controlling the spread of infrasound signals outside the perimeter of the infrasound active zone, the plurality of second infrasound generators positioned in at least one second area that is outside the at least one predetermined first area.

10. The active non-lethal infrasound system of claim 9, wherein the infrasound active zone is positioned within an airspace portion of an airfield.

11. The active non-lethal infrasound system of claim 10, wherein the plurality of second infrasound generators each radiate infrasonic waves that destructively interfere to create at least two or more infrasound-free dead zones outside the perimeter of the infrasound active zone.

12. The active non-lethal infrasound system of claim 11, wherein the infrasound-free dead zones are outside the domain of the predetermined areas, located at opposite sides of the infrasound active zone and extended to cover large spaces.

13. The active non-lethal infrasound system of claim 12, wherein one of the extended infrasound-free dead zones constitutes a bird sanctuary that is furnished with feed, water, grass, seedlings and bushes to provide a refuge for birds being denied access to the infrasound active zone.

14. The active non-lethal infrasound system of claim 13, further comprises a plurality of third infrasound generators that mimic the mating calls of a plurality of birds species of interest, the plurality of third infrasound generators positioned outside the infrasound active zone and at least one of the plurality of third infrasound generators positioned in a one of the at least two or more infrasound-free dead zones.

15. The active non-lethal infrasound system of claim 10, wherein the infrasound active zone is expanded to encompass all areas in the airport including critical areas around aircraft and other high value systems.

16. An active non-lethal method for denying birds access to predetermined areas, comprising:
providing a plurality of first infrasound generators in a first area;
radiating infrasonic waves from the plurality of first infrasound generators to overlap to form a plurality of constructive interference patterns in a domain of airstrips and runways;
providing a plurality of second infrasound generators in a second area outside a perimeter the first area; and
radiating infrasonic waves from the plurality of first infrasound generators to overlap to form a plurality of destructive interference patterns outside the domain of the airstrips and runways;
wherein radiating said infrasonic waves to form said plurality of constructive interference patterns creates an infrasound active zone that repels birds, and radiating said infrasonic waves to form said plurality of destructive interference patterns creates one or more infrasound-free dead zones which provide a refuge for birds being repelled from the infrasound active zone.

17. The active non-lethal method for denying birds access to predetermined areas of claim 16, wherein said predetermined areas are within an airspace portion of an airfield.

18. An active non-lethal method for denying birds access to predetermined areas, comprising:
providing a plurality of first infrasound generators in a first area;
radiating a plurality of continuous and intermittent infrasound signals from the plurality of first infrasound generators to create an infrasound active zone;
providing a plurality of second infrasound generators in a second area outside a perimeter of the first area; and
radiating a plurality of signals from the second infrasound generators that cancel the plurality of continuous and intermittent infrasound signals radiated at a perimeter of the infrasound active zone;
wherein radiating the plurality of signals that cancel the plurality of continuous and intermittent infrasound signals radiated at the perimeter of the infrasound active zone creates an infrasound cancellation barrier for controlling the spread of infrasound signals outside the perimeters of the infrasound active zone.

19. The active non-lethal method for denying birds access to predetermined areas of claim 18, wherein said predetermined areas are within an airspace portion of an airfield.

20. The active non-lethal method for denying birds access to predetermined areas of claim 18, wherein at least one of the plurality of continuous and intermittent infrasound signals is radiated in a frequency range of 0.20 to 0.14 Hz.

* * * * *